United States Patent [19]
Jordaan et al.

[11] Patent Number: 5,382,653
[45] Date of Patent: Jan. 17, 1995

[54] PREPARATION OF COPOLYMERS

[75] Inventors: Johannes C. M. Jordaan; Wilhelmus P. Mul; Abraham A. Smaardijk; Jan Harm Mulder; Eric-Jack Gerard; Peter W. Lednor, all of Amsterdam, Netherlands

[73] Assignee: Shell Oil Company, Houston, Tex.

[21] Appl. No.: 157,783

[22] Filed: Nov. 23, 1993

[30] Foreign Application Priority Data

Nov. 30, 1992 [EP] European Pat. Off. ............ 92203697

[51] Int. Cl.6 ............................................ C08G 67/02
[52] U.S. Cl. ................................. 528/392; 528/271; 528/482; 528/490
[58] Field of Search ................ 528/392, 482, 490, 271

[56] References Cited

U.S. PATENT DOCUMENTS 4,824,935 4/1989 Van Broekhoven et al. .
4,889,914 12/1989 Van Broekhoven et al. .
5,021,496 6/1991 Machado et al. .
5,115,002 5/1992 Van Helden et al. .
5,122,564 6/1992 George .

FOREIGN PATENT DOCUMENTS 478088 4/1992 European Pat. Off. .

Primary Examiner—Nathan M. Nutter
Assistant Examiner—Shelley A. Dodson

[57] ABSTRACT

A process for the preparation of linear alternating copolymers of carbon monoxide and an ethylenically unsaturated compound by polymerizing the monomers in the presence of a suitable catalyst system, one or more components present in the reaction mixture being contaminated with alkali(ne earth) metal salt(s), which process involves a treatment by which at least part of the alkali(ne earth) metal salt is removed such that the total amount of alkali(ne earth) metals present in the copolymerization product is less than 1 part per million by weight; a copolymer composition comprising said copolymer, an alkali(ne earth) metal salt contaminant and a stabilizing quantity of a substance which is able to bind at least part of the alkali(ne earth) metal salt. A method for melt processing said copolymer, wherein the copolymer which contains an alkali(ne earth) metal salt contaminant is mixed with a stabilizing quantity of a substance which is able to bind at least part of the alkali(ne earth) metal salt, the substance being other than a hydroxyapatite or a zeolite-type trivalent metal silicate, and wherein the resulting mixture is melt processed.

14 Claims, No Drawings

PREPARATION OF COPOLYMERS

BACKGROUND OF THE INVENTION

The invention relates to a process for the preparation of copolymers of carbon monoxide with one or more compounds comprising an ethylenically unsaturated bond.

It is known that copolymers in which the units originating from carbon monoxide substantially alternate with the units originating from the ethylenically unsaturated compound(s), may be prepared by contacting the monomers under polymerization conditions in the presence of a suitable catalyst.

Convenient methods for preparing such copolymers are disclosed in prior art references, such as EP 181014 and EP 248483. The copolymers obtained according to these, or similar preparation methods, are relatively high molecular weight compounds, having established utility as thermoplastics in the production of shaped articles, such as containers for foods and drinks and parts for the car industry and for various applications in the domestic sphere.

For these uses and the like, the copolymers have to be melt processed, i.e. they have to be brought in molten state so that they can be molded or extruded. In view of their high melting point, usually of 200° C. or above, the melt stability of the copolymers may become a problem if the copolymers are to remain in molten state for a substantial length of time. The longer the copolymers are subjected to high temperatures, the more they are susceptible to degradation caused by chemical reactions.

The formation of degradation products will usually be at the expense of the properties of the copolymer product.

The presence of specific impurities in the copolymers may have a negative effect on the stability of the copolymers while being processed at high temperatures.

The origin of these impurities is not always known, but in many cases they are apparently introduced in the reactor, together with the starting materials, the catalyst or with the diluent or solvent, if any.

It has already been proposed to reduce the content of typical impurities, such as sulfur in sulfidic form and iron present as iron carbonyl, which impurities often occur in the carbon monoxide feedstock, in particular if the carbon monoxide used is a commercial grade feedstock, such as commonly available at (petro)chemical sites.

While a reduction in the content of these impurities in the carbon monoxide monomer feed has a favorable effect on the average reaction rate at which the polymerization proceeds, it has little effect on the melt stability of the copolymers obtained.

It has now been found that the melt stability of the copolymers of the invention is adversely affected by the presence therein of alkali metal and/or alkaline earth metal impurities, hereinafter sometimes referred to as metal impurities, and that a significant improvement in melt stability is achieved by reducing the metal impurities content of the produced copolymers.

It has also been found that a significant improvement in melt stability is achieved by reducing the alkali(ne earth) metal salt content of the produced copolymers or by adding to a copolymer which is contaminated with alkali(ne earth) metal salt a substance which is able to bind the contaminating salt. Evidently, both treatments may be combined as well.

The detrimental influence of minute quantities of alkali(ne earth) metal salts on the melt stability of the copolymers is surprising in view of the prior art. For example, in EP-A-285218 it is disclosed to treat the copolymers with alkali metal N,N-diethyldithiocarbamate as a step in reducing the concentration of palladium or nickel catalyst remnants for the purpose of improving the copolymers' melt stability. In U.S. Pat. No. 3,948,850 it is disclosed to stabilize ethylene/carbon monoxide copolymers having up to 50% mol carbon monoxide by adding thereto a dihydro phosphoric acid salt of an alkali(ne earth) metal.

Calcium hydroxyapatite and zeolites containing a metal of Group 2 of the Periodic Table, such as calcium, have been recommended as metal stabilizers for the linear alternating copolymers of carbon monoxide and ethylenically unsaturated compounds. The present invention surprisingly teaches that trace quantities of the alkali(ne earth) metal salts which may be present in the polymers need to be substantially reduced or removed or need to be bound in order to stabilize the copolymers, as opposed to the prior art which teaches that these metals have to be added.

SUMMARY OFF THE INVENTION

Accordingly, the invention relates to a process for the preparation of linear alternating copolymers of carbon monoxide and one or more ethylenically unsaturated compounds by reacting the monomers under polymerization conditions in the presence of a suitable catalyst system, one or more components present in the reaction mixture being contaminated with metal impurities which process involves a treatment by which at least part of the metal impurities are substantially reduced or removed such that the total amount of metal impurities present in the copolymerization product are less than 1 part per million by weight.

The invention also relates to a copolymer composition comprising a linear alternating copolymer of carbon monoxide and one or more ethylenically unsaturated compounds, a contaminant comprising metal impurities and a stabilizing quantity of a substance such as a hydroxyapatite or a zeolite-type trivalent metal silicate which is able to bind at least part of the metal impurities.

Finally, the invention also relates to a method for melt processing a linear alternating copolymer of carbon monoxide and one or more ethylenically unsaturated compounds, wherein a linear alternating copolymer of carbon monoxide and one or more ethylenically unsaturated compounds which contains a contaminant comprising metal impurities is mixed with a stabilizing quantity of a substance such as a hydroxy apatite or a zeolite-type trivalent metal silicate which is able to bind at least part of the metal impurities, and wherein the resulting mixture is melt processed.

The metal impurities are present in the form of salts, for example sodium chloride, sodium acetate or sodium silicate. The treatment according to this invention causes, in addition to a reduction of the metal impurities content, a reduction in the amount of the accompanying anion of the copolymerization.

DETAILED DESCRIPTION OF THE INVENTION

Depending on the origin of the metal impurities, the treatment resulting in a decrease in metal impurities content of the copolymers produced, may be carried out after, during or prior to the copolymerization reaction. For example, in the event that the impurities are introduced into the reactor, as contaminants in more than one of the reactor components, the treatment will preferably be carried out during the polymerization reaction.

In the event that the source of the metal impurities can be attributed to a specific component in the reaction mixture, it is advantageous to subject only that component to the said treatment, prior to the polymerization reaction. For example, if the copolymerization is carried out in the presence of a diluent which is contaminated with metal impurities, it is preferred to reduce the metal impurities content of the diluent before introducing the diluent into the reactor. When said treatment is carried out during or prior to the copolymerization reaction the metal impurities content of the reaction mixture is reduced.

It has been observed that the metal impurities content of the copolymers, produced by a process, not involving the treatment according to the invention, is usually in the range of 1–5 parts per million by weight (ppmw). Conceivably in some cases the metal impurities content may be up to 100 ppmw. The melt stability of these copolymers is usually unsatisfactory. The treatment of the invention results in a substantial improvement in melt stability of the copolymers and is preferably performed such that the metal impurities content of the copolymers is reduced to less than 1 ppmw and more preferably to less than 0.1 ppmw. When said treatment is carried out during or prior to the copolymerization the metal impurities are preferably removed to such an extent that the metal impurities content of the reaction mixture is below 0.5 ppmw and more preferably below 0.05 ppmw.

For reducing the metal impurities content of the copolymers, various treating methods may be elected. A convenient method may consist in contacting the reaction mixture, or one or more components thereof, such as a contaminated starting material or a contaminated diluent, with a solid material capable of binding or otherwise inactivating the contaminating metal impurities, followed by at least partial removal of the metal impurities-enriched solid material.

For example, if a liquid diluent or solvent is used which is contaminated with alkali metals, usually in the form of alkali metal salts such as sodium chloride, or sodium silicate, it is recommended to pass the impure liquid through a bed, substantially consisting of a solid adsorbent, followed by passing the purified liquid to the reactor. Alternatively, finely divided solid adsorbent particles may be admixed with the contaminated liquid, followed by filtering off the alkali metal-enriched adsorbent particles and introducing the filtrate into the reactor.

The treatment of metal impurities-contaminated monomer feedstocks, in particular liquid feedstocks such as propene, may be carried out in a similar manner. In principle the metal impurities-enriched adsorbent, when formed during or after the polymerization process, is separated from the copolymers, e.g. by selectively dissolving the latter and removing the metal impurities-enriched adsorbent from the solution. However, solvents capable of selectively dissolving the copolymers in most cases are not readily available. Therefore it is preferred that the treatment is carried out at a stage before the copolymers are formed.

Preferred adsorbents are solid materials, capable of adsorbing, generally as a heterogeneous adsorbent, most of the metal impurities ions, such as sodium, lithium and potassium ions, and a major part of the accompanying anions such as chloride, bromide, and acetate ions.

Suitable solid adsorbents include ion-exchange resins, zeolites and basic solid materials. Liquid adsorbents may be used as well, but generally do not offer special advantages.

A much preferred adsorbent for the practice of this invention are apatites, having the general formula $M_{10}(PO_4)_6X_nY_{2-n}$, wherein M is barium, strontium or, preferably, calcium, n is 0, 1 or 2, X is OH and Y is fluorine. Calcium hydroxy apatite is a naturally occurring calcium-phosphate, and the major constituent of bone and tooth mineral. It is a crystalline material which is also referred to as tribasic calcium phosphate.

However, when the treatment of this invention involves treating a lower aliphatic alcohol, for example methanol, or a mixture containing a substantial quantity of a lower aliphatic alcohol, it is less preferred to use an apatite as the adsorbent because as is known in the art, apatites may not be completely inert in lower aliphatic alcohols.

Suitable ion exchange resins are typically resins containing strong acidic groups, such as sulfonic acid groups, as the cation exchanging groups on a matrix. For the exchange of anions accompanying the alkali(ne earth) metal a strong basic ion exchange resin can be used, such as a resin containing quaternary ammonium hydroxide groups exemplified by benzyltrimethylammonium. Very suitably the cation and anion exchange resins are used in a mixed bed or a resin is used which combines the anion and cation exchanging groups on a single matrix. Crosslinked polystyrene is an example of a suitable matrix for ion exchange resins. Very suitable systems of one or more ion exchange resins are those which can be used in water demineralization processes. Very good results have been obtained with a mixed bed ion exchange resin.

Although the amount of solid adsorbent is not critical, a limited amount is usually used in order to avoid the handling and removal of large amounts of material. Preferably the amount of solid adsorbent is less than 5% by weight of the treated contaminated component(s) of the reaction mixture. Most preferably, the amount of solid adsorbent is in the range of from 0.000001 to 0.5% by weight of the component(s) to be treated.

It may be convenient to use electrical conductivity as a characterization of liquid components, which are usually essentially organic and non-ionic by nature, after they have been treated with an adsorbent. Suitably the electrical conductivity is lower than 200 $\mu$S/m, preferably less than 100 $\mu$S/m and more preferably less than 60 $\mu$S/m. Throughout this application the electrical conductivities are specified as conductivities measured at 20° C.

A treatment according to this invention which does not involve the use of a solid adsorbent may comprise washing the copolymer powder as prepared in the reactor, with a washing liquid which is able to substantially reduce or remove alkali(ne earth) metal salts from the copolymer. The invention also relates to a washing per se comprising washing a preformed reactor powder of the copolymer which contains a contaminant comprising an alkali(ne earth) metal salt with a washing liquid which is able to remove at least part of the alkali(ne earth) metal salt(s) from the copolymer, preferably such that after the washing the total amount of alkali(ne earth) metals present in the copolymer is less than 1 part per million by weight.

Suitable washing liquids may be diluents in which the copolymer is insoluble or virtually insoluble and which are substantially free of alkali(ne earth) metal salts, for example by being prior treated with one or more ion exchange resins as described hereinbefore. The washing liquid is suitably essentially organic, polar and non-ionic by nature, for example an aliphatic alcohol or ketone having up to four carbon atoms, and has typically an electrical conductivity of less than 200 $\mu$S/m. It may be advantageous to have water present in such a washing liquid, for example 1–20% vol relative to the resultant liquid mixture, with an equal content of alkali(ne earth) metal(s), relative to the total weight of the liquid. The washing liquid may also essentially consist of water having an electrical conductivity of less than 1000 $\mu$S/m, in particular less than 600 $\mu$S/m. Very good results can be obtained by washing a copolymer powder, contaminated with alkali(ne earth) metal salt, with methanol or with methanol/water (95/5 v/v) which has initially been made essentially free of alkali(ne earth) metal salt by a treatment with one or more ion exchange resins.

Another example of a suitable washing liquid may be a diluent in which the copolymer is insoluble or virtually insoluble and to which one or more complexing agents for the contaminating alkali(ne earth) metal ion(s) has been added.

The catalyst system used in the process of the invention is preferably a catalyst containing one or more metals of Group VIII of the Periodic Table of Elements.

The amount of catalyst used in the process of the invention is not critical and may vary within wide ranges, e.g. between $10^{-7}$ and $10^{-2}$ gram atom of Group VIII metal per mol of ethylenically unsaturated compound to be copolymerized. Preferably the amount is between $10^{-6}$ and $10^{-4}$ on the same basis.

The metals of Group VIII include iron, cobalt, nickel, ruthenium, rhodium, palladium, osmium, iridium and platinum. Among these, cobalt, nickel, ruthenium, rhodium and palladium are preferred. In particular a catalyst system based on palladium, is preferred.

Very suitable catalyst systems are catalytically active compositions based on a palladium compound, an anion of an acid with a pKa of less than 6, preferably less than 4, and a bidentate ligand.

Preferred bidentate ligands may be represented by the general formula $R^1R^2M^1RM^2R^3R^4$ wherein each of $M^1$ and $M^2$ independently represents a phosphorus, arsenic, antimony or nitrogen atom, each of $R^1$, $R^2$, $R^3$ and $R^4$ independently represents a substituted or non-substituted hydrocarbyl group and R represents a divalent organic bridging group containing at least two carbon atoms in the bridge.

Preferably $M^1$ and $M^2$ each represent a phosphorus atom. Suitably $R^1$, $R^2$, $R^3$ and $R^4$ represent the same, optionally substituted hydrocarbyl group, preferably an aromatic group such as phenyl, diphenyl or naphthyl group or an aromatic group containing one or more substituents, in particular polar substituents such as halogen atoms, halogenated alkyl groups, alkoxy groups such as methoxy, ethoxy or isopropyloxy groups, hydroxyl, (di)alkylamino or ester groups.

Preferably one or two substituents are located at the ortho position(s) in the aromatic ring with respect to the phosphorus atom to which that aromatic group is linked.

The copolymerization process of the invention may proceed in the gasphase, but is typically carried out by contacting the monomers in the presence of a suitable diluent with the catalyst system, usually a solution of a compound of a Group VIII metal in a suitable solvent, such as acetone, or methanol. Suitable diluents are typically those in which the formed copolymers are insoluble or virtually insoluble.

The diluent is preferably aprotic compound, such as an alcohol, for example methanol, isopropanol and butanol-1. As explained above, the diluent may have been subjected to a treatment for reducing its metal impurities content thereof, before being introduced into the reactor.

Ethylenically unsaturated compounds suitable to be copolymerized with carbon monoxide in the process of the invention include compounds consisting exclusively of carbon and hydrogen and compounds which in addition contain one or more heteroatoms, typical examples being unsaturated esters such as methyl acrylate. Preferably, however, unsaturated hydrocarbons are used, in particular lower olefins such as ethene, propene and butene-1 and mixtures thereof and olefins substituted with an aromatic group such as styrene and p-alkylstyrenes.

Ethene and mixtures comprising ethene and propene are in particular preferred starting materials.

The molar ratio between the monomers, viz. carbon monoxide and the ethylenically unsaturated compound(s) is suitably selected in the range of from 5:1 to 1:5, preferably in the range of from 1.5:1 to 1:1,5.

The copolymerization reaction is suitably carried out at a temperature in the range of from 10°–200° C. and a pressure in the range of from 1 to 200 bar. Preferred temperatures are in the range of from 20°–180° C. in particular in the range of from 30°–150° C. Preferred pressures are selected in the range of from 5 to 100 bar.

In other embodiments of this invention the stability of a linear alternating copolymer of carbon monoxide and one or more ethylenically unsaturated compounds which is contaminated with an alkali(ne earth) metal salt is improved by using as a stabilizer a substance which is able to bind at least a part of the alkali(ne earth) metal salt.

The alkali(ne earth) metal salt binding substances used in the compositions of the invention and in the method of melt processing according to the invention may be organic or inorganic. Examples of suitable organic substances include previously disclosed ion exchange resins. Inorganic substances which possess ion adsorbing capacity are phosphates other than hydroxyapatites, for example zirconium phosphates, such as alpha- and gama-zirconium phosphate, and lanthanium phosphate. Good stabilizing activities have been found when using one or more of barium phosphate, lanthanium phosphate, magnesium orthophosphate, calcium silicium phosphate, magnesium silicium phosphate, aluminum phosphate and fluorapatite (i.e. a mineral of the formula $Ca_{10}(PO_4)_6F_2$). Preferred stabilizers are selected from the group consisting of lanthanium phosphate, magnesium silicium phosphate and calcium silicium phosphate.

The quantity of the alkali(ne earth) metal salt binding substances to be used is not critical as long as melt stabilization of the copolymer is achieved. Generally, a quantity in the range of from 0.01% wt to 5.0% wt, relative to the quantity of the copolymer, will be effective; preferably a quantity of from 0.02% wt to 1.0% wt, and more preferably from 0.05% wt to 0.5% wt, on the same basis is effective.

These substances are frequently solids thus forming a solid phase in the compositions of the invention. They are preferably used as a finely divided material, typically having a volume-average particle size in the range of from 0.1–50 μm, and preferably in the range of from 0.5–10 μm.

The melt stability of the copolymers may be further improved by adding one or more stabilizers, conveniently by dry blending of the copolymers and the stabilizing compounds, at any downstream stage of the process. Materials known to be suitable in this respect, include inorganic or organometallic compounds, such as zinc aluminates, alumina hydrogels and cupric chromite. As mentioned hereinbefore, calcium hydroxyapatite and calcium containing zeolites have also been recommended as suitable stabilizers. Also, other polymeric additives such as antioxidants, dyes, fillers or reinforcing agents, fire resistant materials, mold release agents, and colorants may be included in the composition. These additives are added to improve the processability of the polymers or the properties of the resultant blend.

The melting processing according to this invention may be conventional and may include extrusion and injection molding into sheets, plates and shaped articles.

The invention is further illustrated by the following non-limiting experiments and examples.

Experiment 1

The influence of trace quantities of various salts on the melt stability of a linear alternating copolymer of carbon monoxide, ethene and propene was measured as follows.

Samples of linear alternating copolymer of carbon monoxide, ethene and propene (melting point 222° C.) were loaded with any one of the salts indicated in Table I, by impregnating the samples with a solution of salt in de-ionized (double-distilled) water and drying. For comparison one copolymer sample was treated in the same way with de-ionized water, but without a salt dissolved therein. The resultant copolymer powders were compression molded to form 1 mm thick sheets by pressing at 250° C. for 0.5 minutes at 4 kg/cm² and 1.5 minutes at 40 kg/cm². Circular discs cut from the sheets were subjected to dynamic rheology testing, i.e. measurement of dynamic shear moduli, at a temperature of 275° C., using an angular frequency of 1 rad/s and the sample being held between aluminum discs at a distance of 0.9 mm. The aluminum discs were disposable discs, pretreated with an Alodine S solution. The crossover time (COT), is indicated in Table I for each sample. A higher crossover time is indicative of a better thermal stability of the copolymer.

TABLE I

| Salt (metal content of polymer, ppmw) | COT minutes |
| --- | --- |
| — | 32 |
| Sodium chloride (5.0) | 10 |

TABLE I-continued

| Salt (metal content of polymer, ppmw) | COT minutes |
| --- | --- |
| Sodium bromide (5.0) | 11 |
| Sodium iodide (5.0) | 13 |
| Sodium acetate (5.0) | 7 |
| Sodium nitrate (5.0) | 12 |
| Sodium sulfate (5.0) | 23 |
| Sodium perchlorate (5.0) | 5 |
| Potassium bromide (8.6) | 8 |
| Magnesium sulfate (5.3) | 15 |
| Calcium chloride (8.2) | 1 |
| Barium bromide (30.2) | 2 |

These experiments show that trace amounts of alkali(ne earth) metal salts contaminating the linear alternating copolymers have a detrimental influence on the copolymer's stability.

Experiment 2

The thermal stability of a model compound, representing a carbon monoxide/ethene copolymer, and the influence of (the removal of) trace quantities of alkali(ne earth) metal impurities thereon were measured as follows. The model compound, tetradecan-3,6,9,12-tetraone, was prepared by using methods described by H. Stetter, Angew. Chem. 88 (1976).

Tetradecan-3,6,9,12-tetraone (1 g, containing 300 ppmw sodium) was dissolved in 50 ml dichloromethane which was essentially free of alkali(ne earth) metal. Calcium hydroxyapatite (0.04 g, containing less than 0.1% wt sodium) was suspended in this solution. The resulting suspension was stirred for 1 hour and filtered. The tetradecan-3,6,9,12tetraone was recovered by evaporating the filtrate to dryness. Sodium analysis of the recovered model compound gave a sodium content of 20 ppmw. The calcium hydroxyapatite remaining on the filter was dried; its sodium content was 0.58% wt.

Samples of the fresh and of the recovered tetradecan. -3,6,9,12-tetraone were heated at 240° C. under nitrogen. GLC analysis carried out after 24 hours of heat exposure revealed that the untreated tetradecan-3,6,9,12-tetraone was completely converted (degraded) and that 94% of the recovered tetradecan -3,6,9,12-tetraone was converted into a range of decomposition products.

The above experiment was repeated using 1 g of a different sample of the tetradecan-3,6,9,12-tetraone and using 0.04 g lanthanium phosphate instead of calcium hydroxyapatite.

Elemental analysis of the fresh and the recovered tetradecan-3,6,9,12-tetraone were as follows: 9 ppmw and 2 ppmw sodium, 3.5 ppmw and 0.6 ppmw calcium, 0.2 ppmw and 0.2 ppmw magnesium, less than 0.5 ppmw and 35 ppmw lanthanium, respectively. The elemental analysis of the fresh and the recovered lanthanium phosphate were as follows: 55 ppmw and 500 ppmw sodium, 45 ppmw and 180 ppmw calcium, less than 30 ppmw and 70 ppmw magnesium, respectively.

GLC analysis after heating the fresh and the recovered tetradecan-3,6,9,12-tetraone (240° C., 20 hours) revealed that 60% of the fresh model compound was converted and 20% of the model compound recovered.

These experiments show that calcium hydroxyapatite and lanthanium phosphate adsorbed alkali(ne earth) metal contaminants and that the treatment of the model compound with calcium hydroxyapatite or lanthanium phosphate leads to an improvement in thermal stability.

There is also a correlation between the rate of decomposition upon heating at 240° C. and the alkali(ne earth) metal content of the tested samples. It is evident that the melt stability of linear alternating copolymers of carbon monoxide and ethylenically unsaturated compounds can be improved by removing therefrom alkali(ne earth) metal salt contaminants.

Example 1 (for comparison)

A carbon monoxide/ethene copolymer was prepared as follows. A 4000 ml autoclave equipped with a stirrer was charged with 1500 ml methanol/water (95/5 v/v) containing alkali metal salt contaminants and having an electrical conductivity of 360 $\mu$S/m. The reactor was closed and the air therein was removed by pressurizing with carbon monoxide to 15 bar and releasing the pressure. This procedure of pressurizing and pressure release was repeated three times. The temperature in the autoclave was raised to 88° C. and a mixture of carbon monoxide and ethene in a 2:1 ratio was introduced until the pressure was 26 bar. To the autoclave was added a catalyst solution containing: 0.0065 mmol palladium acetate, 0.0069 mmol 1,3-bis[bis(2-methoxyphenyl)-phosphino]propane, 0.0040 mmol trifluoroacetic acid and 4.3 ml acetone. The acetone used for preparing the catalyst solution contained alkali metal salt contaminants and had an electrical conductivity of 75 $\mu$S/m.

After a period of 17 hours the polymerization was terminated by cooling the reaction mixture at room temperature and releasing the pressure. Solid powdery product was filtered off, washed with methanol/water, which was taken from the same stock as the diluent used in the polymerization, and dried.

A sample of the obtained white polymer powder was compression molded using substantially the procedure as described in Experiment 1. The sheet obtained was whitish with a grizzly shade.

Example 2

A carbon monoxide/ethene polymer was prepared substantially as described in Example 1, but with the differences that prior to their use in the preparation the methanol/water and the acetone were both peculated over a mixed bed anion/cation exchange resin sold under the trade name MILLIPORE ION-EX CARTRIDGE. The electrical conductivities of the perculate methanol/water and acetone were 57 $\mu$S/m and 38 $\mu$S/m, respectively.

The obtained polymer powder was white. The sheet obtained by compression molding this powder was whitish without having a grizzly shade.

The improved color of the compression molding sheeting, compared with the color of the sheet obtained in Example 1 is indicative of an improved thermal stability of the copolymer.

Example 3

A carbon monoxide/ethene polymer was prepared substantially as described in Example 1. A sample of the copolymer powder obtained was washed four times with methanol which had been peculated over a mixed bed anion/cation exchange resin sold under the trade name MILLIPORE ION-EX CARTRIDGE. The electrical conductivity of the peculated methanol was 23 $\mu$S/m.

The washed copolymer powder was compression molded and tested in dynamic rheology testing substantially as described in Experiment 1. The crossover time was 20 minutes.

The electrical conductivities of the washing liquid obtained in each washing were 650 $\mu$S/m, 200 $\mu$S/m, 200 $\mu$S/m, 60 $\mu$S/m, and 52 $\mu$S/m, respectively, indicating that alkali metal salt impurities were removed from the copolymer during each of the washings.

For comparison a sheet was compression molded from a sample of the unwashed copolymer and a circular disc cut from the sheet was subjected to the dynamic rheology testing. The crossover time was 14 minutes.

The improved thermal stability of the washed sample is evident from the measurement of the crossover time.

Examples 4–13

Samples of a linear alternating copolymer of carbon monoxide, ethene and propene (melting point 222° C.), which was contaminated with alkali metal salt, were powder blended with 0.25% w or 0.20% w (calculated on the weight of the composition) of any one of the phosphates listed in Table II. The resultant powder mixtures were compression molded and tested in dynamic rheology testing substantially as described in Experiment 1. For comparison a sample of the copolymer was tested unblended. The crossover times (COT) for these samples are shown in Table II.

TABLE II

| Example | Phosphate (concentration, % w) | COT minutes |
|---|---|---|
| 4 | — *) | 22 |
| 5 | Calcium hydroxyapatite (0.25) *) | 39 |
| 6 | Lanthanium phosphate (0.25) | 39 |
| 7 | Barium phosphate (0.25) | 33 |
| 8 | Calcium fluorapatite (0.25) | 28 |
| 9 | Magnesium orthophosphate (0.20) | 37 |
| 10 | Calcium phosphate (0.20) | 31 |
| 11 | Calcium silicium phosphate (0.20) | 39 |
| 12 | Magnesium silicium phosphate (0.20) | 30 |
| 13 | Aluminum phosphate (0.20) | 29 |

*) for comparison, not according to invention

The data shown in Table II demonstrates an improvement in thermal stabilities of the samples made according to the teachings of this invention.

While this invention has been described in detail for the purpose of illustration, it is not to be construed as limited thereby but is intended to cover all changes and modifications within the spirit and scope thereof.

What is claimed is:

1. A process for the preparation of copolymers of carbon monoxide and one or more ethylenically unsaturated compounds by reacting the monomers under polymerization conditions in the presence of a catalyst system comprising at least one metal of Group VIII of the Periodic Table, one or more components present in the reaction mixture being contaminated with alkali metal and alkaline earth metal impurities, which process involves a treatment by which the said metal impurities content of the copolymerization product is reduced to less than 1 part per million by weight.

2. A process as in claim 1, wherein said treatment is carried out during or prior to the copolymerization reaction.

3. A process as in claim 1, wherein one or more metal impurities containing components of the reaction mixture is subjected to said treatment, before being introduced into the copolymerization reactor.

4. A process as in claim 1, wherein said treatment is carried out such that the amount of metal impurities present in the copolymerization product is reduced to less than 0.1 to 1 part per million by weight.

5. A process as in claim 1 wherein said treatment comprises contacting one or more of the components of the reaction mixture with a solid adsorbent capable of adsorbing ions of said metal impurities to form a metal impurities-enriched absorbent, followed by substantial removal of said metal impurities-enriched adsorbent.

6. A process as claim 5 wherein said solid adsorbent is present in an amount of from 0.000001 to 0.5% by weight of the component(s) treated.

7. A process as in claim 5 wherein said solid adsorbent comprises one or more ion exchange resins containing anion and cation exchanging groups on a matrix.

8. A process as in claim 1 wherein the produced copolymer is washed with a liquid capable of removing said metal impurities from the copolymer.

9. A process as in claim 8 wherein said liquid is a diluent in which said copolymer is insoluble or virtually insoluble and which has an electrical conductivity of less than 200 μs/m.

10. A method as in claim 1 for improving the melt stability of a linear alternating copolymer of carbon monoxide and one or more ethylenically unsaturated compounds comprising washing a preformed reactor powder of the copolymer which contains metal impurities with a liquid which is capable of removing said metal impurities from the copolymer.

11. A copolymer composition as in claim 1 comprising a linear alternating copolymer of carbon monoxide and one or more ethylenically unsaturated compound, metal impurities, and a stabilizing quantity of a substance which is capable of binding said metal impurities.

12. A copolymer composition as in claim 11 wherein said substance is a hydroxyapatite or a zeolite-type trivalent metal silicate.

13. A copolymer as in claim 11 wherein said substance is selected from the group consisting of barium phosphate, lanthanium phosphate, magnesium orthophosphate, calcium silicium phosphate, magnesium silicium phosphate, aluminum phosphate and fluorapatite.

14. A composition as in claim 11 wherein said substance is present in an amount of from 0.02 to 1 wt % of the copolymer.

* * * * *